United States Patent Office 3,637,613
Patented Jan. 25, 1972

3,637,613
POLYMERIZATION OF CYCLIC SULFIDES
Edwin J. Vandenberg, Foulk Woods, Del., assignor to Hercules Incorporated, Wilmington, Del.
No Drawing. Continuation-in-part of application Ser. No. 374,171, June 10, 1964. This application Sept. 13, 1966, Ser. No. 578,999
Int. Cl. C08g 23/00, 23/14
U.S. Cl. 260—79            5 Claims

ABSTRACT OF THE DISCLOSURE

Halogen-free organomagnesium compounds reacted with a polyreactive compound, such as a compound containing at least two active hydrogens as in water, ammonia, and resorcinol, are effective catalysts for the polymerization of episulfides. Crystalline polymers of episulfides are described.

---

This application is a continuation-in-part of my application U.S. Ser. No. 374,171, filed June 10, 1964, but abandoned after the filing of the instant application.

This invention relates to a new process for the preparation of polymeric sulfides and to the essentially linear polymers thus produced. The invention relates also to essentially linear polymeric sulfides having essentially completely head-to-tail structure.

More particularly, this invention relates to the polymerization of episulfides in the presence of organomagnesium compounds whereby there are produced polymers of relatively high molecular weight.

In accordance with this invention, it has been determined that polymers of relatively high molecular weight can be derived by the polymerization of episulfides when there is used as a catalyst for the polymerization reaction a halogen-free organomagnesium compound that has been reacted with at least one polyreactive compound.

Episulfides that can be used in carrying out the invention are those wherein the episulfide group is a thiirane ring. In accordance with this invention, these episulfide monomers can be homopolymerized or copolymerized with other monomers such as another episulfide or an epoxide to produce both amorphous and crystalline polymers.

Episulfides that can be polymerized in accordance with this invention include those having the formula (I) 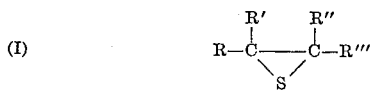

wherein R, R', R'', and R''' are each individually selected from the group consisting of hydrogen and hydrocarbon radicals. Examples of hydrocarbon radicals include alkyl such as methyl, ethyl, propyl, isopropyl, n-butyl, isobutyl, tert-butyl, pentyl, hexyl, heptyl, and the like; alkenyl such as ethenyl, propenyl, 2-butenyl, and 1,3-butadienyl; aryl such as phenyl, diphenyl, and naphthyl; cycloalkyl such as cyclopentyl, cyclohexyl, and cycloheptyl; cycloalkenyl such as cyclopentenyl, cyclohexenyl, and cycloheptenyl; haloalkyl such as chloromethyl, fluoromethyl, trichloromethyl, and the like; alkoxymethyl such as methoxymethyl, ethoxymethyl, propoxymethyl and the like; aroxymethyl such as phenoxymethyl; and the like hydrocarbon radicals.

Specific examples of such episulfides include ethylene sulfide, propylene sulfide, tetramethyl ethylene sulfide, tetrafluoromethyl ethylene sulfide, butene-1 sulfide, octadecene-1 sulfide, isobutylene sulfide, cis-2-butene sulfide, trans-2-butene sulfide, chloromethyl ethylene sulfide, 1,1-bis(chloromethyl)ethylene sulfide, styrene sulfide, butadiene monosulfide, allyloxymethyl ethylene sulfide, allylphenyloxymethyl ethylene sulfide, phenyloxymethyl ethylene sulfide, isopropyl ethylene sulfide, tert-butyl ethylene sulfide, methoxymethyl ethylene sulfide, 1,2-bis(methoxymethyl)ethylene sulfide, 1,2-diphenyl ethylene sulfide, 1,2-dicyclohexyl ethylene sulfide, 1,2-bis(chloromethyl)ethylene sulfide, 1,2-bis(fluoromethyl)ethylene sulfide, trifluoromethyl ethylene sulfide, trichloromethyl ethylene sulfide, and 1,2-bis(trifluoromethyl)ethylene sulfide.

In Formula I above, when R and R''' are both hydrogen, R' and R'' taken together with the two carbon atoms of the thiirane ring can form a cycloaliphatic ring, i.e., (II) 

which can contain an ethylenic double bond or which can be substituted with alkyl radicals such as methyl, ethyl, n-propyl, and isopropyl. Specific examples of episulfides of this type include cyclohexene sulfide, cyclopentene sulfide, cyclododecatriene monosulfide, and dicyclopentadienyl sulfide.

In preparing the catalyst for use in this invention the amount of total polyreactive compound that is reacted with the organomagnesium compound is important and should be an equivalent mole ratio within the range of from about 0.01 to about 0.7, and preferably from about 0.05 to about 0.5, of the polyreactive compound to the organomagnesium compound.

Any organomagnesium compound, which contains no halogen, when reacted with the above-mentioned polyreactive compounds can be used as the catalyst for the homopolymerization and copolymerization of episulfides in accordance with this invention. Preferably, the organomagnesium compound will have the formula RR'Mg where R is any hydrocarbon radical such as alkyl, alkenyl, cycloalkyl, cycloalkenyl, aryl, alkaryl, cycloalkyl-aryl, and the like, and R' is the same as R or is H, —OR, —NR₂, —SR and the like. Exemplary of the organomagnesium compounds that can be used for the prepartion of the catalyst are dimethylmagnesium, diethylmagnesium, dipropylmagnesium, diisopropylmagnesium, di-n-butylmagnesium, diisobutylmagnesium, di-(tert-butyl)magnesium, diamylmagnesium, dioctylmagnesium, dicyclohexylmagnesium diphenylmagnesium, ethylmagnesium hydride, butylmagnesium hydride, methoxy methylmagnesium, ethoxy ethylmagnesium, etc. Mixtures of any of these organomagnesium compounds can be used if desired.

As pointed out above, the organomagnesium compound used as the catalyst in accordance with this invention is reacted with a polyreactive compound. The term "polyreactive compound" means any compound, organic or inorganic, which has at least two sites for reaction with the organomagnesium compound. Thus, any compound which has at least two groups or sites to react with organomagnesium compounds to form an O-Mg, S-Mg, N-Mg, P-Mg, C-Mg, or the like, bond can be used.

Such polyreactive compounds are compounds containing at least two active hydrogens; compounds containing one active hydrogen and one of the group selected from oxygen doubly bonded to carbon (C=O), oxygen doubly bonded to nitrogen (N=O), oxygen doubly bonded to sulfur (S=O), oxygen doubly bonded to phosphorus (P=O), sulfur doubly bonded to carbon (C=S), sulfur doubly bonded to phosphorus (P=S), nitrogen doubly bonded to nitrogen (N=N), and nitrogen triply bonded to carbon (C≡N); compounds containing no active hydrogen and at least two groups selected from C=O, N=O, S=O, P=O, C=S, P=S, C≡N, and N=S; and such polyreactive compounds as carbon monoxide and nitric oxide.

As is well known, an active hydrogen is a hydrogen in a compound, organic or inorganic, wherein the hydrogen is attached to a non-metallic element other than carbon, such as oxygen, sulfur, nitrogen, phosphorus, and the like, and therefore, active. It can also be hydrogen attached to carbon wherein the hydrogen atom is a so-called acidic hydrogen or hydrogen activated by the presence of some activating group (an electron withdrawing group) in the α-position to the carbon to which the active hydrogen is attached such as hydrogen bound to a carbon α to a C=O group, α to a —COOR group, α to a S=O group, α to an N=O group, α to a C≡N group or the equivalent N≡C group, and the like. Thus, the active hydrogen can be that present in one of the following groups: —OH, —SH, —NH$_2$, —NHR, —CONH$_2$, =CHNO, =CHNO$_2$, =N—OH, —SO$_3$H, —SO$_2$H, —O—SO$_2$H, —SO$_2$NH$_2$, —CH—CO—, =CH—C≡N, =CHSO$_2$—, and —COOH.

Exemplary of the active hydrogen compounds containing at least two active hydrogens that can be used as the polyreactive compounds for the reaction with the organomagnesium compound to form the catalyst used in accordance with this invention are water; alkylene glycols and cycloaliphatic polyols, such as ethylene glycol, trimethylene glycol, tetramethylene glycol, pentamethylene glycol, glycerol, pentaerythritol, trimethylol propane, 2-butene-1,4-diol, 2-butyne-1,4-diol, 1,3-cyclohexanediol, 1,4-cyclohexanediol, and the like; polyhydric phenols such as resorcinol, hydroquinone, pyrocatechol, bisphenol A (p,p′-isopropylidenediphenol); ammonia, amines such as methylamine, ethylamine, n-butylamine, amylamines, and the like; arylamines, such as aniline; aralkylamines, such as benzylamine; cycloalkylamines, such as cyclohexylamine; diamines, such as ethylenediamine, diethylene triamine, triethylene tetramine, hexamethylene diamine, p-phenylenediamine, and piperazine; hydroxylamine; aminoalcohols, such as ethanolamine, tetrahydroxy ethyl ethylene diamine, and the like; hydrazine, phenyl hydrazine; amides such as urea, thiourea, acetamide, and malonamide; sulfenamides and sulfonamides such as p-toluene sulfonamide; hydrogen sulfide; dimercaptans, such as ethanedithiol, 1,5 - pentanedithiol, and dithioresorcinol; 2-mercaptoethylamine; dialkyl sulfides; dialkyl disulfides; dialkyl polysulfides; sulfones and hydroxysulfones, such as dibutylsulfone, hydroxyethyl methyl sulfone; sulfoxides, such as dibutyl sulfoxide, dimethyl sulfoxide; acids such as sulfuric acid, sulfurous acid, phosphorus acid, phosphoric acid, carbonic acid, acetic acid, oxalic acid, phthalic acid, ethylenediamine tetraacetic acid, α,α-dioctyl ethylenediamine diacetic acid, malonic acid, succinic acid, adipic acid; ketones, such as acetone, diacetyl, dibenzoylmethane, 2-hydroxyethyl methyl ketone, acetylacetone, acetonylacetone, diacetylacetone, acetophenone; esters, such as malonic esters, as for example, methyl malonate and ethyl malonate, acetoacetic acid esters such as ethyl acetoacetate; nitro or nitroso alkanes such as nitromethane, nitroethane, nitrosomethane, and the like; nitriles and iso-cyanides, such as acetonitrile, hydracrylonitrile (3-hydroxypropionitrile), and the like; the hydrate of formaldehyde; and (HNS)$_4$. Obviously, many other active hydrogen compounds wherein there are present in the molecule at least two active hydrogens can be used.

Exemplary of other polyreactive compounds that can be reacted with an organomagnesium compound to form the catalysts used in this invention are compounds containing one active hydrogen and one C=O group, as for example, benzoic acid; compounds containing one active hydrogen and one N=O group, such as nitrosophenol; compounds containing one active hydrogen and one S=O group such as benzene sulfinic acid; compounds containing one active hydrogen and one P=O group, as for example, dimethyl hydrogen phosphite; compounds containing one active hydrogen and one C=S group such as dithiobenzoic acid; compounds containing one active hydrogen compound and one P=S group such as esters of dithiophosphoric acid; compounds containing one active hydrogen and one C≡N group such as hydrogen cyanide; compounds containing at least two C=O groups and no active hydrogen such as carbon dioxide, glyoxal, the dialkyl esters of oxalic acid, and the like; compounds containing at least two N=O groups and no active hydrogen, as for example, nitrobenzene and nitrogen dioxide; compounds containing at least two S=O groups and no active hydrogen, such as sulfur dioxide; compounds containing at least two P=O groups and no active hydrogen, such as phosphorous pentoxide and tributyl phosphate; compounds containing at least two C=S groups and no active hydrogen such as carbon disulfide; compounds containing at least two P=S groups and no active hydrogen, as for example, phosphorous pentasulfide; compounds containing at least two N=S groups and no active hydrogens, such as nitrogen sulfide (N$_4$S$_4$); compounds containing at least two C≡N or N≡C groups and no active hydrogen, as for example, cyanogen, phthalyl nitriles, and phenylene isocyanide; compounds containing at least one N=N group, as for example, azobenzene; compounds containing at least one C=O group and at least one N=O group such as nitrosobenzaldehyde, nitrosobenzophenone, and the like compounds.

The exact nature of the reaction product of the organomagnesium compound with the polyreactive compounds is not known. It is believed that a reaction takes place whereby a portion of the hydrocarbon group attached to the magnesium is replaced with another group, the latter depending upon the polyreactive compound used. It is believed that the active catalyst species consists of at least two organomagnesium groups joined together by the polyreactive compound. Thus, if the polyreactive compound is difunctional, the reaction product with the organomagnesium compound would have the formula

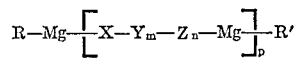

where R is an organo group, R′ is an organo group, H, —OR, —NR$_2$, —SR, and the like, X and Z are oxygen, sulfur, nitrogen,

phosphorus,

and the like, and X and Z can be alike or different, Y is a divalent moiety derived from the polyreactive compound, $m$ is 0 or 1, $n$ is 0 or 1, and $p$ is 1 or more.

If the polyreactive compound contains three or more reactive sites, then one obtains highly branched structures, as for example

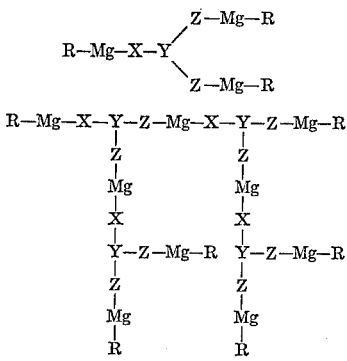

The lowest molecular species of these catalysts are generally preferred since they contain more active alkyl groups per magnesium. Regardless of the theory of the reaction, it is essential that the reaction product retain magnesium to carbon bonds in an amount of from about 0.2 to about 1.8 hydrocarbon group per magnesium atom, and preferably from about 0.4 to about 1.2.

The amount of the polyreactive compound that is reacted with the organomagnesium compound will depend to a large extent on the polyreactive compound, the organomagnesium compound, and to some extent upon the diluent used, the temperature at which the reaction is carried out, and the episulfide to be employed in the polymerization reaction. In any event, it should be within the range of from about 0.01 to about 0.7 mole per mole equivalent of magnesium compound, preferably from about 0.05 to about 0.6, and more preferably from about 0.1 to about 0.4 based on a difunctional reactive compound. Thus, in the case of a difunctional polyreactive compound such as water, one would use from about 0.02 mole to about 1.4 moles of water per mole of organomagnesium compound, and preferably from about 0.1 mole to about 1.2 moles of water per mole of magnesium. If the polyreactive compound contains more than two reactive sites, the amount of the polyreactive compound will be reduced proportionately. In the case of magnesium compounds having the formula MgRR′ where R is organo and R′ is other than H or R, the ratio of polyreactive compound will be lower, as for example, in the range of from about 0.01 to about 0.35 mole equivalents. Below or above these ratios the polymerization is retarded or otherwise adversely affected, as for example, there is produced a liquid polymer instead of a high molecular weight solid polymer. By the term "equivalent mole ratio" as used in this specification and claims is meant the moles of polyreactive compound containing two reactive sites per equivalent of magnesium compound.

Any desired procedure can be used for reacting the organomagnesium compound with the specified ratio of the polyreactive compound. Thus, the organomagnesium compound and the polyreactive compound are preferably prereacted by adding the specified amount of the polyreactive compound to a solution or dispersion of the organomagnesium compound in an inert diluent. Examples of suitable diluents include a hydrocarbon diluent, such as n-hexane, n-heptane, branched aliphatic hydrocarbons, aromatic hydrocarbons, such as benzene, toluene, and the like, cycloaliphatic hydrocarbons, such as cyclohexane and methylcyclohexane and an ether such as diethyl ether, diisopropyl ether, tetrahydrofurane, and the like. Mixtures of two or more diluents can be employed if desire. The reaction of the organomagnesium compound and the polyreactive compound can be carried out at any desired temperature, usually within the range of from about −50° C. to about 200° C., and preferably from about −20° C. to about 150° C. These organomagnesium-active hydrogen compound reaction products can be used immediately or aged, or if desired, heat-treated in some cases.

The reaction of the organomagnesium compound and the active hydrogen compound can be carried out also by reacting the two reagents in situ in the polymerization reaction mixture. This can be accomplished by adding a specified amount of the active hydrogen compound to the episulfide, a mixture of episulfides, or a mixture of an episulfide and epoxide, being polymerized and then adding the organomagnesium compound. In addition, the two reagents can be added to the polymerization reaction mixture simultaneously.

In some cases it has been found to be advantageous to react the organomagnesium-polyreactive compound reaction product with a complexing agent such, for example, as an ether such as diethyl ether, tetrahydrofuran, dioxane, and the like, a thioether, an aminoether, a tertiary amine, or a tertiary phosphine. In this case the organomagnesium compound can be reacted first with the polyreactive compound, and then with the complexing agent, or the latter can be added to the polymerization diluent, or the complexing agent can be present while forming the catalyst. The amount of complexing agent reacted with the catalyst varies widely with the nature of the complexing agent. Thus, with weak complexing agents such as diethyl ether and dioxane, from 0.1 mole up to 100 or more moles per magnesium can be used and with stronger complexing agents such as tertiary amines, phosphines, and some cyclic ethers, an amount of from 0.1 mole to about 10 moles per magnesium can be used, and preferably from about 1 mole to about 3 moles per magnesium is used. In the case of the weaker complexing agents such as diethyl ether, the complexing agent can be used as the sole diluent for the polymerization.

Any amount of the organomagnesium reaction product prepared as described above can be used to catalyze the polymerization process in accordance with this invention from a minor catalytic amount up to a large excess, but, in general, will be within the range of from about 0.1 to 10 mole percent based on the magnesium and the monomer or monomers being polymerized and preferably will be within the range of from about 0.5 to about 5 mole percent. The amount used depends in part on such factors as monomer purity, diluent purity, and the like, less pure episulfides and diluents requiring more catalyst to destroy reactive impurities.

The polymerization reaction can be carried out by any desired means, either as a batch or continuous process with the catalyst added all at one time or in increments during the polymerization or continuously throughout the polymerization. If desired, the monomer can be added gradually to the polymerization system. It can be carried out as a bulk polymerization process, in some cases at the boiling point of the monomer (reduced or raised to a convenient level by adjusting the pressure) so as to remove the heat of reaction. It can be carried out also in the presence of an inert diluent. Any diluent that is inert under the polymerization reaction conditions can be used, as for example, ethers such as the dialkyl, aryl, or cycloalkyl ethers such as diethyl ether, dipropyl ether, diisopropyl ether, aromatic hydrocarbons such as benzene, toluene, and the like, or saturated aliphatic hydrocarbons and cycloaliphatic hydrocarbons such as n-heptane, branched aliphatic hydrocarbons, cyclohexane, and the like. Obviously, any mixture of such diluents can be used and in many cases is preferable. The polymerization process can also be carried out in the presence of additives, such as antioxidants, carbon black, zinc stearate, and some accelerators and other curatives.

The polymerization process in accordance with this invention can be carried out over a wide temperature range and pressure range. Usually, it will be carried out at a temperature of from about −80° C. up to about 150° C., preferably within the range of from about −50° C. to about 120° C., and more preferably from about −30° C.

to about 100° C. Usually, the polymerization process will be carried out at autogeneous pressure, but superatmospheric pressures up to several hundred pounds can be used if desired, and, in the same way, subatmospheric pressures can also be used.

The following examples are illustrative of the preparation of a catalyst for use in this invention.

EXAMPLE 1

A catalyst was prepared under nitrogen, and in the presence of glass beads, from 0.33 part of diethylmagnesium in diethyl ether (about 0.5 M solution) by adding to the solution at 0° C. and with agitation 1 mole of water per mole of magnesium and subsequently agitating the mixture at 0° C. for 4 hours and then for 3 days at 25° C. This catalyst is referred to by the formula $(C_2H_5)_2Mg \cdot 1.0H_2O$.

EXAMPLE 2

A catalyst was prepared under nitrogen, in the presence of glass beads, from 0.33 part of diethylmagnesium in diethyl ether (about 0.48 M solution) and 0.4 mole of ammonia per mole of magnesium by mixing the two together at 0° C. and subsequently agitating the mixture at 30° C. for 20 hours. This catalyst is referred to by the formula $(C_2H_5)_2Mg \cdot 0.4NH_3$.

EXAMPLE 3

A catalyst was prepared under nitrogen, and in the presence of glass beads, from 0.33 part of diethylmagnesium in diethyl ether (about 0.5 M solution) by adding to the solution at 0° C. 0.3 mole of resorcinol per mole of magnesium and subsequently agitating the mixture at a temperature of 30° C. for a period of about 20 hours. This catalyst is referred to by the formula $(C_2H_5)_2Mg \cdot 0.3$ resorcinol.

The following examples are illustrative of this invention. All parts and percentages are by weight unless otherwise indicated.

In the examples, the molecular weight of the polymers is shown by their reduced specific viscosity (RSV). The term "reduced specific viscosity" means the $\eta_{sp}/c$ as determined on a 0.1% solution of the polymer in chloroform at 25° C. unless otherwise specified.

The melting point, where given, was determined by differential thermal analysis, also referred to as DTA. The procedure for determining the melting point of a polymer by differential thermal analysis is described in Organic Analysis, vol. 4, by J. Mitchell et al., Interscience Publishers, New York, 1960. See particularly pages 372–383 of this reference.

EXAMPLE 4

Polymerization vessel filled with nitrogen was charged with 10 parts of propylene sulfide. After equilibrating the vessel and its contents at 25° C. the catalyst solution of Example 1, about 5.8 parts, was injected into the vessel. The polymerization reaction mixture was agitated for 19 hours at a temperature of 25° C. The reaction was then stopped by the addition to the vessel of 4 parts of anhydrous ethanol. Four volumes of n-heptane and one volume of diethyl ether were added to the reaction mass and this mixture was washed twice with a 3% aqueous solution of hydrogen chloride, washed neutral with water, and then the insoluble polymer was collected. The polymer was washed twice with diethyl ether and once with a 1% solution of Santonox in diethyl ether. The polymer was then dried for 18 hours at 80° C. in vacuo. Santonox is a proprietary designation for 4,4'-thiobis(6-tert-butyl-m-cresol). Total conversion of the propylene sulfide to poly(propylene sulfide) was 96% and 100% of this was isolated. The isolated polymer had an RSV of 6.2, was a head-to-tail polymer, and as determined by X-ray diffraction analysis was crystalline.

One part of the crystalline poly(propylene sulfide) of Example 4 was purified by dissolving it in 86 parts of toluene at 25° C. Some insoluble matter was separated out, washed with toluene and dried. This gave 0.1 part of a crystalline solid. The toluene solution was crystallized overnight at —20° C., cooled in Dry Ice, and centrifuged to collect the insoluble portion. The above recrystallization procedure was repeated three more times except that in the last recrystallization the toluene contained, by weight, 0.05% of phenyl-β-naphthylamine. The purified poly(propylene sulfide) was then dried by heating for 16 hours at 80° C. in vacuo, and there was obtained 0.09 part of a film that had an RSV of 3.0 as measured in a 0.04% solution of the polymer in chloroform at 25° C. The polymer was highly crystalline by X-ray diffraction analysis and had a melting point of 73° C.

EXAMPLE 5

A polymerization vessel filled with nitrogen was charged with 10 parts of propylene sulfide. After equilibrating the vessel and contents at 30° C. the catalyst solution of Example 2, about 5.8 parts, was injected into the vessel. The polymerization reaction mixture was agitated for 19 hours at a temperature of about 30° C. and then stopped by adding to the reaction vessel 4 parts of anhydrous ethanol. The reaction mass was then dissolved in toluene, washed twice with a 3% aqueous solution of hydrogen chloride, and then washed neutral with water. The polymer was stabilized by adding to the solution 0.1%— by weight, based on the weight of the polymer, of phenyl-β-naphthylamine. The solvent was removed and the polymer was dried at 80° C. in vacuo. The percent conversion of propylene sulfide to poly(propylene sulfide), isolated by the above procedure, was 92%, and the polymer had an RSV of 2.4. As determined by X-ray diffraction analysis, the polymer was crystalline.

EXAMPLE 6

Example 5 was repeated except that the catalyst employed with the catalyst of Example 3. About 97% of the propylene sulfide was converted to poly(propylene sulfide) which had an RSV of 1.4 and was amorphous.

EXAMPLE 7

A polymerization vessel similar to that employed in Example 4 was charged with 10 parts of cis-2-butene sulfide. After equilibrating the vessel and contents at 0° C., about 5.8 parts of a catalyst solution prepared in accordance with Example 2 was injected into the vessel. The polymerization reaction mixture was agitated for a period of 19 hours at a temperature of 0° C., and then stopped by adding to the vessel 4 parts of anhydrous ethanol. Toluene-insoluble poly(cis-2-butene sulfide) was isolated from the reaction mass by adding thereto toluene. The resulting mixture was washed twice with a 3% aqueous solution of hydrogen chloride, and then washed neutral with water. The toluene-insoluble polymer was then collected, washed twice with toluene and once with 0.1% solution of Santonox in toluene. The polymer was then dried for 16 hours at 80° C. in vacuo. The amount of the monomer that was converted to toluene-insoluble polymer was 19%, and the polymer had an RSV of 3.0. As determined by X-ray diffraction analysis, the polymer was crystalline, and it had a melting point of about 158° C.

EXAMPLE 8

Into a polymerization vessel similar to that employed in Example 4 there was charged 10 parts of isobutylene sulfide, and the vessel and contents were equilibrated at —78° C. About 5.5 parts of a catalyst solution prepared in accordance with Example 2 were then injected into the vessel. The polymerization reaction mixture was reacted for 19 hours at a temperature of about —78° C., and then at 0° C. for 48 hours. After 3 hours at —78° C., 5.5 parts of the catalyst solution, prepared in accordance with Example 2, were injected into the polymerization vessel.

The polymerization reaction was stopped by adding 4 parts of anhydrous ethanol to the reaction vessel. Diethyl ether was added to this reaction mass and the resulting mixture was washed twice with a 3% aqueous solution of hydrogen chloride, and then washed neutral with water. The ether-insoluble portion of the mixture was then collected, washed twice with diethyl ether, once with a 0.05% solution of Santonox in diethyl ether, and dried for 16 hours at 80° C. in vacuo.

The ether filtrate and washes were combined and then precipitated with 5 volumes of methanol. The insoluble portion was collected, washed once with methanol, once with a 0.2% solution of Santonox in methanol, and dried. The resulting product, poly(isobutylene sulfide), was a white powder having an RSV of 0.08 and was crystalline as determined by X-ray diffraction analysis. The amount of monomer that was converted to this product was 4%.

The amount of the monomer that was converted to ether-insoluble poly(isobutylene sulfide) was 14.4%. The ether-insoluble polymer had a melting point of about 185° C. and was crystalline as determined by X-ray diffraction analysis. This polymer was a head-to-tail polymer, based on its nuclear magnetic resonance spectra. The RSV of this polymer was 0.71 as determined on a 0.1% solution of the polymer in tetrachloroethane at 100° C.

EXAMPLE 9

Ethylene sulfide, 10 parts, was charged into a polymerization vessel filled with nitrogen together with 30 parts of toluene. After the vessel and contents were equiliberated at 50° C., about 1.44 parts of a catalyst prepared in accordance with Example 1 were injected into the polymerization vessel. The resulting reaction mixture was agitated for a period of about 44 hours at a temperature of about 50° C. and was then stopped by adding to the reaction vessel 4 parts of anhydrous ethanol. After about 19½ hours of reaction time had elapsed, an additional 1.44 parts of the catalyst, prepared in accordance with Example 1, were added to the vessel. The resulting reaction mass was diluted with diethyl ether, washed twice with a 3% aqueous solution of hydrogen chloride, and then washed neutral with water. The insoluble poly(ethylene sulfide) was separated, washed with diethyl ether, and once with a 0.4% solution of Santonox in diethyl ether. The polymer was then dried for 16 hours at 80° C. in vacuo.

The amount of the monomer that was polymerized to ether-insoluble polymer was about 27%, and the polymer had an RSV of greater than 0.5. The ether-insoluble polymer was crystalline as determined by X-ray diffraction analysis and had a melting point of 213° C. The RSV of this polymer is determined on a 0.1% solution of the polymer in ethylene trithiocarbonate at 170° C.

This polymer was insoluble at room temperature and at 100° C. in tetrahydrofurane, dimethyl formamide, chloroform, toluene, n-heptane, tetrachloroethane, and a 60:40 phenol-tetrachloroethane mixture.

EXAMPLE 10

A polymerization vessel filled with nitrogen was charged with about 30 parts of toluene and about 10 parts of ethylene sulfide, and the vessel and its contents subsequently equilibrated at about 50° C. About 1.44 parts of a catalyst solution prepared in accordance with Example 2 were then injected into the polymerization vessel. The resulting reaction mixture was subsequently agitated at a temperature of about 50° C. for a period of about 19 hours and then stopped by adding 4 parts of anhydrous ethanol to the vessel. The ether-insoluble poly(ethylene sulfide) was isolated by the same procedure as that employed in Example 9. The amount of the monomer that was converted to ether-insoluble polymer was 100%, and the polymer had an RSV greater than 0.5 (determined in the same manner as Example 9). The polymer was of high crystallinity as determined by X-ray diffraction analysis and had a melting point of about 215° C. Elemental analysis gave 39.92% carbon and 7.36% hydrogen which agreed substantially with theoretical values for poly(ethylene sulfide) of 40.0% carbon and 6.72% hydrogen. The polymer was compression molded at 200° C. for 3 minutes at 1200 p.s.i. to give a hard, glossy film having a tensile strength of 9400 p.s.i., an elongation of 7%, and a modulus of 285,000 p.s.i.

EXAMPLE 11

A polymerization vessel filled with nitrogen was charged with about 37 parts of toluene and about 10 parts of propylene sulfide, and the vessel and contents subsequently equilibrated at 30° C. About 5.8 parts of a catalyst solution prepared in accordance with Example 1 were then injected into the vessel. The resulting reaction mixture was then agitated at a temperature of about 30° C. for 19 hours and then stopped by the addition of 4 parts of anhydrous ethanol to the reaction vessel. Toluene was added to the reaction mass. The resulting mixture was washed twice with a 3% aqueous solution of hydrogen chloride and then washed neutral with water. Phenyl-β-naphthylamine, 0.1% based on the weight of the polymer, was added to the mixture and the solvent removed therefrom. The phenyl-β-naphthylamine stabilized polymer was then dried.

Monomer conversion to poly(propylene sulfide) was 95%, and the polymer had an RSV of 2.4. The polymer was amorphous as determined by X-ray diffraction analysis.

EXAMPLE 12

Ethylene sulfide, 10 parts, was polymerized in accordance with the procedure of Example 10 with the exception that the vessel and its contents were equilibrated at 0° C. and the polymerization reaction was carried out at 0° C. for 72 hours. The amount of monomer that was converted to ether-insoluble polymer was 95%.

EXAMPLE 13

In this example the procedure of Example 10 was repeated except that the catalyst used was prepared in accordance with Example 2, using 0.8 mole of ammonia per mole of magnesium instead of 0.4 mole. Also, the polymerization reaction was carried out for 17 hours instead of for 19 hours. The amount of ethylene sulfide that was converted to ether-insoluble poly(ethylene sulfide) was 93%. This polymer had an RSV of greater than 0.5 as determined on a 0.1% solution of the polymer in ethylene trithiocarbonate at 170° C. The ether-insoluble poly (ethylene sulfide) was purified further to remove catalyst residue by treating 2.5 parts of the polymer with 60 parts of a 60:40:10 toluene-butanol-concentrated hydrochloric acid mixture for 16 hours at 50° C. The polymer was recovered by filtration, washed neutral with methanol, and then washed with a 0.4% solution of Topanol CA in methanol. Topanol CA is a proprietary designation for a a condensation product of crotonaldehyde with 3 moles of 3-methyl-6-tert-butylphenol. The polymer was then dried. The purified polymer had an RSV of greater than 0.5 as determined on a 0.1% solution thereof in ethylene trithiocarbonate at 170° C.

EXAMPLE 14

In this example the process of Example 10 was repeated except that the catalyst used was prepared in accordance with Example 2 using 1.2 moles of ammonia per mole of magnesium instead of 0.4 mole. Also, the polymerization reaction was carried out for 17 hours instead of 19 hours. The amount of ethylene sulfide that was converted to ether-insoluble poly(ethylene sulfide) was 89%.

EXAMPLE 15

Ethylene sulfide was polymerized in accordance with the procedure of Example 10 using a catalyst prepared in accordance with Example 2 using 2.0 moles of ammonia per mole of magnesium instead of 0.4 mole. Also, the polymerization reaction was carried out for 17 hours instead of 19 hours. The amount of ethylene sulfide that was converted to poly(ethylene sulfide) was 34%.

EXAMPLE 16

Example 13 was repeated except that the poly(ethylene sulfide) product was isolated by washing the reaction mass twice with a 10% aqueous solution of hydrogen chloride, and then washed neutral with water. During each wash with the 10% hydrogen chloride solution, the mixture was stirred for 2 hours. The reaction mass was subsequently stirred for 15 minutes with a 2% aqueous solution of sodium bicarbonate and then washed neutral. Ether-insoluble poly(ethylene sulfide) was then separated, washed twice with diethyl ether, once with a 0.4% solution of Topanol CA in ether, and dried. About 96% of the ethylene sulfide was converted to ether-insoluble poly(ethylene sulfide) which had an RSV of greater than 0.5 as measured on a 0.1% solution of the polymer in ethylene trithiocarbonate at 170° C. The polymer was molded at 200° C. to a hard, strong film.

EXAMPLE 17

In this example the process of Example 8 was repeated except that the catalyst used was prepared in accordance with Example 2 using 0.8 mole of ammonia per mole of magnesium instead of 0.4 mole. About 5.8 parts of the catalyst were used. Also, in this example, the vessel and its contents were equilibrated at 30° C. and the polymerization reaction was carried out at 30° C. for 19 hours. Ether was added to the reaction mass and the isolation procedure of Example 16 was employed to isolate the ether-insoluble poly(isobutylene sulfide). The ether-insoluble poly(isobutylene sulfide) was a white powder, was crystalline by X-ray diffraction analysis, had an RSV of 1.24 as measured on a 0.1% solution of the polymer in tetrachloroethane at 100° C., and had a melting point of 187° C. The amount of isobutylene sulfide that was converted to ether-insoluble poly(isobutylene sulfide) was 82%. No ether-soluble polymer was present. The polymer was compression molded at 180° C. to a hard, strong, clear film which had a tensile strength of 2100 p.s.i., an elongation of 2%, and a modulus of 220,000 p.s.i.

EXAMPLE 18

Example 17 was repeated using cis-2-butene episulfide instead of isobutylene sulfide. Toluene-insoluble polymer was isolated by the procedure of Example 16 with the exception that toluene was first added to the reaction mass instead of diethyl ether. About 70% of the cis-2-butene sulfide was converted to poly(cis-2-butene episulfide). A white film was obtained. The polymer was crystalline by X-ray diffraction analysis, had a melting point of 155° C., and had an RSV of 0.93 as measured on a 0.1% solution of the polymer in tetrachloroethane at 100° C. About 23% of the monomer was converted to toluene-soluble polymer which was crystalline by X-ray diffraction analysis, which had a melting point of 149° C., and which had an RSV of 0.66 as measured on a 0.1% solution of the polymer in tetrachloroethane at 100° C.

EXAMPLE 19

Example 17 was repeated using trans-2-butene episulfide instead of isobutylene sulfide and with the exception also that the polymerization reaction was carried out for 48 hours at 30° C. and an additional equal amount of catalyst was added after 24 hours and after 26 hours of reaction time. About 1.7% of the trans-2-butene episulfide was converted to an ether-insoluble polymer which had an RSV of 0.44 as measured on a 0.05% solution of the polymer in chloroform at 25° C., which had a melting point of 118° C., and which was crystalline by X-ray diffraction analysis. The product obtained was in the form of a film which was solid and tough. About 0.75% of the trans-2-butene episulfide was converted to an ether-soluble, rubbery solid polymer which was crystalline by X-ray diffraction analysis, and which had an RSV of 0.34 as measured on a 0.05% solution of the polymer in chloroform at 25° C.

EXAMPLE 20

Example 18 was repeated except propylene sulfide was employed in the polymerization reaction instead of cis-2-butene episulfide. No toluene-insoluble polymer was obtained. About 95% of the propylene sulfide was converted to toluene-soluble poly(propylene sulfide) which was a tough, rubbery product. The polymer was amorphous by X-ray diffraction analysis and had an RSV of 1.8.

EXAMPLE 21

Example 20 was repeated except that the catalyst employed was prepared in accordance with Example 2 using 1.2 moles of ammonia per mole of magnesium instead of 0.4 mole of ammonia. About 62% of the propylene sulfide monomer was converted to a toluene-soluble polymer which was tacky and rubbery. The toluene-soluble poly(propylene sulfide) had an RSV of 0.81 and was crystalline by X-ray diffraction analysis.

EXAMPLE 22

A polymerization vessel with a nitrogen atmosphere was charged with 10 parts of toluene and 10 parts of cyclohexene sulfide. After equilibrating at 0° C., about 5.8 parts of a catalyst solution prepared in accordance with Example 2 was added. The polymerization reaction mixture was agitated for 19 hours at 0° C. and then the reaction was stopped by adding 4 parts of anhydrous ethanol. The reaction mixture was diluted with toluene, washed twice with a 3% aqueous solution of hydrogen chloride, and then neutral with water. The polymer was precipitated by adding 4–5 volumes of methanol. It was then collected, washed with methanol and dried for 16 hours at 80° C. in vacuo. The hard, solid polymer so obtained amounted to a yield of 80%.

EXAMPLES 23–29

In these examples, the catalysts were prepared under nitrogen, adding to a 0.25 M solution of diethylmagnesium in ether cooled to 0° C., an amount of the polyreactive compound (indicated below) equal to 0.5 mole per mole of magnesium and then agitating the mixture, in the presence of glass beads, for 20 hours at 30° C.

In each example, a polymerization vessel filled with nitrogen was charged with 18.5 parts of toluene and 5 parts of propylene sulfide. After equilibrating at 30° C., an amount of the catalyst solution (or suspension) equal to 5.6 parts was added. The reaction mixture was agitated at 30° C. for 19 hours and then the reaction was stopped by adding 2 parts of anhydrous ethanol. A total solids on a sample was then run to indicate the percent conversion obtained. Diethyl ether was added to dilute the reaction mixture and the latter was then washed twice with a 3% aqueous solution of hydrogen chloride and then neutral with water. The polymer was then precipitated by adding 5 volumes of methanol. The insoluble was collected, washed twice with methanol and then with a 0.2% solution of Santonox in methanol, after which it was dried for 16 hours at 80° C. in vacuo.

Tabulated below is the polyreactive compound used in preparing the catalyst, the percent conversion by total solids, together with the percent conversion of isolated polymer and RSV thereof.

| Example | Polyreactive compound used in catalyst preparation | Total solids, percent conv. | Isolated polymer Percent conv. | RSV |
|---|---|---|---|---|
| 23 | Acetylacetone | 30 | 23 | 0.80 |
| 24 | CS₂ | 97 | 79 | 1.5 |
| 25 | Acetic acid | 99 | 58 | 3.4 |
| 26 | Nitrobenzene | 81 | 39 | 1.4 |
| 27 | Acetonitrile | 100 | 74 | 1.8 |
| 28 | CO | 100 | 72 | 1.9 |
| 29 | NO | 95 | 65 | 2.0 |

The poly(propylene sulfide)s produced in Examples 23–26, 28 and 29 were shown to be crystalline by X-ray diffraction analysis and that of Example 27 was amorphous.

While the above specific examples are directed to the preparation of homopolymers of episulfides, it is to be understood that the process of this invention can be employed to produce copolymers of episulfides and other monomers, particularly the epoxide monomers.

Thus, any epoxide wherein the epoxy group is an oxirane ring can be copolymerized with an episulfide by the process of this invention. Suitable epoxides include ethylene oxide, monosubstituted ethylene oxides having the formula

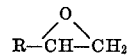

and symmetrically di-substituted ethylene oxides having the formula

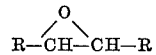

In the above formulas R is a hydrocarbon radical such as alkyl, aryl, cycloalkyl, and the like.

Examples of these epoxides are the alkylene oxides which include ethylene oxide, propylene oxide, 1-butene oxide, the 2-butene oxides, isobutylene oxide, 1-hexene oxide; substituted alkylene oxides which cyclohexene oxide, styrene oxide, glycidyl ethers of phenol, bisphenol and the like; unsaturated epoxides such as vinyl cyclohexene monoxide, butadiene monoxide, allyl glycidyl ether, allylphenyl glycidyl ether, and the like; and halogen-containing epoxides such as epichlorohydrin, epibromohydrin, epifluorohydrin, trifluoromethyl ethylene oxide, perfluoroethylene oxide, and perfluoropropylene oxide.

The copolymers of this invention will be comprised of, by weight, from about 10% to 99% of an episulfide such as propylene sulfide and from about 90% to 1% of an epoxidesuch as ethylene oxide. The following example illustrates this aspect of the invention. All parts and percentages are by weight unless otherwise indicated.

EXAMPLE 30

A polymerization vessel filled with nitrogen was charged with 30 parts of toluene, 9.4 parts of ethylene sulfide, and 0.6 part of ethylene oxide, and the vessel and its contents subsequently equilibrated at 30° C. About 1.44 parts of a catalyst solution prepared in accordance with Example 2 was then injected into the vessel. The resulting reaction mixture was agitated at a temperature of 30° C. for 17 hours and the reaction stopped by adding 4 parts of anhydrous ethanol to the vessel. About 18.6% of the total monomer concentration was converted to a copolymer which was crystalline by X-ray diffraction analysis and which had a melting point of 207° C. Based on sulfur analysis, the copolymer contained 9.4% ethylene oxide and 90.6% ethylene sulfide. The RSV of the copolymer was 2.3 as measured on a 0.1% solution of the copolymer in α-chloronaphthalene at 135° C. The X-ray diffraction pattern resembled that of crystalline poly(ethylene sulfide).

In preparing the polymers and copolymers of this invention, irrespective of the type or conditions of polymerization chosen, the amount of catalyst employed will be sufficient to catalyze to homopolymerization or copolymerization polymers having a weight average molecular weight of at least about 50,000, and preferably more than 100,000.

The reduced specific viscosity (RSV) of a polymer can usually be measured on a 0.1% concentration of the polymer in chloroform at 25° C. if, of course, the polymer is soluble in choloroform under these conditions. If the polymer is insoluble under these conditions, then the RSV is determined on a 0.1% solution of the polymer in tetrachloroethane at elevated temperatures, usually about 100° C. However, poly(ethylene sulfide) prepared in accordance with this invention, is a highly crystalline, highly insoluble polymer and requires special conditions for measuring its RSV. The RSV of poly(ethylene sulfide) can be determined on a 0.1% solution thereof in ethylene trithiocarbonate at 170° C. The polymer is dissolved in the ethylene trithiocarbonate in a minimum of time. If degradation of the polymer occurs while measuring the RSV, the RSV can be determined by measuring the RSV as a function of time and extrapolating to zero time.

The preferred polymers of this invention will have an inherent viscosity of at least about 0.5, and preferably at least about 1.0. Inherent viscosity can be calculated from RSV by the following formula $$\text{Inherent viscosity} = \frac{\log_e \left(\frac{RSV}{10} + 1\right)}{C}$$

In the formula C is the concentration of the polymer in the solution used to determine RSV. Thus, for example, the Example 5 polymer had an RSV of 2.4; using the above formula, this gives an inherent viscosity of about 2.15.

The homopolymers and copolymers of this invention can be fabricated into films, fibers, and molded articles of outstanding physical properties and of excellent stability to light and to oxygen at moderate temperatures.

Poly(ethylene sulfide) having an RSV of greater than 0.5 as determined on a 0.1% solution thereof in ethylene trithiocarbonate at 170° C. is especially useful for the manufacture of films, fibers, and molded articles because it is very hard and tough, is insoluble in most solvents, and has a high melting point.

Many of the polysulfides of this invention can be stabilized with known antioxidants. Additives that prevent odor formation on molding and/or on aging can be incorporated therein. Such additives include those that react with mercaptans as, for example, epoxides, acrylates, methacrylates, acrylamides, maleimides, metal compounds such as lead compounds, isocyanates, and anhydrides. Fillers, plasticizers, blowing agents, and similar additives can be incorporated in the polymer if desired.

Some of the copolymers of episulfides and epoxides have improved high temperature stability and decreased odor forming tendencies and hence such copolymers are particularly useful in the manufacture of articles requiring these properties.

It is to be understood that the above description and examples are illustrative of this invention and not in limitation thereof.

What I claim and desire to protect by Letters Patent is:

1. The process of producing polymers of episulfides which comprises polymerizing at least one episulfide wherein the episulfide group is a thiirane ring by contacting said episulfide with a catalyst formed by reacting a halogen-free organomagnesium compound having the formula RR'Mg where R is a hydrocarbon radical and R' is R, H, —OR, —NR₂ or —SR with a polyreactive compound selected from the group of water, aliphatic and cycloaliphatic polyols, polyhydric phenols, ammonia, nitriles, carbon monoxide and nitrogen monoxide in the equivalent mole ratio of polyreactive compound to magnesium compound of from about 0.01:1 to about 0.7:1, the amount of said polyreactive compound being such that the catalyst retains magnesium to carbon bonds in the amount of from about 0.2 to about 1.8 hydrocarbon group per magnesium atom.

2. The process of claim 1 wherein the organomagnesium compound is a dialkylmagnesium compound.

3. The process of claim 2 wherein the polyreactive compound is water.

4. The process of claim 2 wherein the polyreactive compound is ammonia.

5. The process of claim 2 wherein the polyreactive compound is resorcinol.

References Cited

UNITED STATES PATENTS

| | | | |
|---|---|---|---|
| 3,000,865 | 9/1961 | Gorgiolo | 260—79 |
| 3,222,324 | 12/1965 | Brodoway | 260—79 |
| 3,222,325 | 12/1965 | Brodoway | 260—79 |
| 3,222,326 | 12/1965 | Brodoway | 260—79 |
| 3,300,454 | 1/1967 | Osborn | 260—79 |
| 3,301,796 | 1/1967 | Herold | 260—79.7 |
| 3,317,489 | 5/1967 | Sander | 260—79 |
| 3,317,919 | 5/1967 | Sander | 260—79 |
| 3,317,920 | 5/1967 | Sander | 260—79 |
| 3,324,051 | 6/1967 | Lal | 260—79.7 |
| 3,325,456 | 6/1967 | Adamek et al. | 260—79.7 |
| 3,365,429 | 1/1968 | Gobran et al. | 260—79 |
| 3,489,728 | 1/1970 | Bailey et al. | 260—79.7 |
| 3,329,659 | 7/1967 | Gobran et al. | 260—79 |
| 3,337,487 | 8/1967 | Vandenberg | 260—79 |
| 3,337,513 | 8/1967 | Kutch et al. | 260—79.7 |
| 3,345,308 | 10/1967 | Lal | 260—79.7 |
| 3,359,248 | 12/1967 | Osborn et al. | 260—79.7 |

OTHER REFERENCES

Dermer: Copolymers of Olefin Sulfides, Armed Forces Technical Information Agency, Astia Document No. AD 110, 496 WADC Technical Report 55–447, June 1956, pp. 10 to 13. Copy in Scientific Library.

Billmeyer, Jr.: Textbook of Polymer Chemistry, 1957, Interscience Publishers, Inc., N.Y., pp. 128 and 129. Scientific Library QD281P6B5.

Boileau et al.: Academie des Sciences (Paris) Comptes Rendus, 254, pp. 2774 to 2776 (1962), Apr. 9, 1962. Copy in Scientific Library.

JAMES A. SEIDLECK, Primary Examiner

U.S. Cl. X.R.

260—79.7